E. C. NEWCOMB.
INTERNAL COMBUSTION ENGINE.
APPLICATION FILED SEPT. 7, 1907.

988,374.

Patented Apr. 4, 1911.
4 SHEETS—SHEET 1.

Fig. 1.

WITNESSES:
Wm. J. Dolan
John Conahey.

INVENTOR
Edward C. Newcomb
BY
J. H. Freeman
ATTORNEY

E. C. NEWCOMB.
INTERNAL COMBUSTION ENGINE.
APPLICATION FILED SEPT. 7, 1907.

988,374.

Patented Apr. 4, 1911.
4 SHEETS—SHEET 4.

WITNESSES:
Wm J. Dolan
John Conahey

INVENTOR
Edward C. Newcomb
BY
J. H. Freeman
ATTORNEY

UNITED STATES PATENT OFFICE.

EDWARD C. NEWCOMB, OF NORTH SCITUATE, MASSACHUSETTS, ASSIGNOR TO NEWCOMB ENGINE COMPANY, OF NEW YORK, N. Y., A CORPORATION OF NEW YORK.

INTERNAL-COMBUSTION ENGINE.

988,374.  Specification of Letters Patent.  Patented Apr. 4, 1911.

Application filed September 7, 1907. Serial No. 391,759.

*To all whom it may concern:*

Be it known that I, EDWARD C. NEWCOMB, a citizen of the United States, and a resident of North Scituate, county of Plymouth, and Commonwealth of Massachusetts, have invented certain new and useful Improvements in Internal-Combustion Engines, of which the following is a specification.

My invention relates to internal combustion engines of the compression type; and, while certain features thereof may be advantageously employed irrespective of the number of cycles, the invention is particularly adapted for two-cycle engines.

An object of the invention is to produce an engine in which high thermal efficiency is combined with high mechanical efficiency, durability, and simplicity.

Another object in view is to provide an engine which may be operated with great variations of power and speed, and one which will be thermally and mechanically efficient when developing a small part of its rated power as well as when developing full rated power.

Other objects of the invention are to provide an engine in which the maximum turning effort or torque may be developed at a lower speed than is possible with variable speed internal furnace engines as heretofore commonly constructed; also to provide an engine which does not depend upon difficult and frequent adjustments for efficient performance under variable conditions, as, for example, variations in the pressure, temperature, and humidity of the atmosphere, and variations in the quality of the fuel; and also to provide an engine which may be practically employed for vehicle propulsion without the necessary intervention of complicated speed-changing devices.

These and other objects of the invention will in part be obvious and in part be more fully explained in the following description.

The thermal efficiency of internal combustion engines of the compression type is dependent, among other things, upon the degree of compression of the charges and the proportion of the available heat therein that is rendered effective at the instants of maximum compression; and, where the volume of the gases at the ends of the expansion periods is no greater than the volume of the charges before compression, the thermal efficiency is independent of the temperature range due to expansion. The attainment of the maximum thermal efficiency in engines of the class referred to, wherein a homogeneous mixture of air and fuel is used, is impossible for the following reasons, among others: (*a*) Complete combustion of the fuel at the instants of maximum compression cannot be effected. Even if the mixture is such as to give the most rapid combustion, only a part of the fuel will be burned before expansion begins. If the proportion of fuel is either greater or less than it should be, the combustion is still slower and all the fuel may not be consumed even at the ends of the expansion periods. (*b*) Where the power of the engine is varied by varying the quantity of the charges, as in the common automobile engines, the degree of compression is correspondingly varied. In this case, moreover, not only is the efficiency less with the lighter loads on account of the reduced compression, but also on account of the fact that, with the reduced compression, the combustion is slower than with full compression.

In accordance with the present invention, the charges of fuel and air are supplied to the piston chamber of the engine in such manner that portions only of the air charges are effectively carbureted at or near the ends of the compression periods, the mixture of the carbureted portions being such as to insure ignition and substantially instantaneous and complete combustion of the fuel at the instants of maximum compression.

In carrying out the invention high thermal efficiency is attained, notwithstanding variations between wide limits of the power developed or load, by supplying charges of air or a supporter of combustion to the piston chamber of an engine of the compression type, supplying variable charges of a liquid fuel to said chamber in such manner as to cause localized diffusion of the fuel in the air, means being provided in the chamber for restraining the extent of the diffusion, whereby variable portions of the air charges are effectively carbureted at or near the ends of the compression periods, and igniting the carbureted portions of the air charges so that substantially complete combustion of the fuel will be effected at the instants of maximum compression. In accordance with the preferred embodiment of my invention, the air charges are supplied to the piston chamber independently of the fuel charges, thus permitting full charges of air to be admitted to said chamber in such manner as to effectively displace the waste gases and provide an atmosphere in which the fuel charges may be rapidly and completely burned irrespective of the variations in the quantity thereof within wide limits. Preferably also the air charges are supplied to the piston chamber under pressure immediately preceding the compression periods and then compressed in said chamber without excessive commotion, thereby permitting easy and effective control of the diffusion of the fuel charges in the air so that variable portions of the air charges may be effectively carbureted at or near the ends of the compression periods. In its preferred form, therefore, the invention is particularly adapted for two-cycle engines although it will be obvious that even in this form the invention may be embodied in engines irrespective of the number of cycles. In order that the variable fuel charges may be so diffused in the air charges that correspondingly variable portions of the air charges are effectively carbureted at or near the ends of the compression strokes, the time relation between the fuel supplying periods and the movements of the piston is varied, more time being required after the introduction of the charges to effect the proper diffusion of the larger fuel charges than of the smaller fuel charges. Means are accordingly provided for advancing the fuel supplying periods with relation to a given position or phase of the piston as the fuel charges increase. Furthermore, in order that the fuel charges may be so diffused in the air charges that variable portions of the air charges will be effectively carbureted at or near the ends of the compression periods, irrespective of variations in the speed of the engine, the time relation between the fuel supplying periods and the movements of the piston may be varied to compensate in part at least for the change in time available for the diffusion of the fuel by reason of the change in the speed of the engine. Where the speed of the engine is to be varied, therefore, means are preferably provided for advancing the fuel supplying periods with relation to the piston in accordance with the increase in the speed of the engine, said means being independent of the means for varying the fuel supplying periods to compensate for variations of load. Ordinarily, however, this will not be sufficient to compensate for the desired variations in the speed of the engine. In accordance with one embodiment of the invention, therefore, other provision is made for effecting the proper diffusion of the fuel irrespective of the speed variations of the engine, the same means being effective also to produce proper diffusion of the fuel under other conditions, such, for instance, as variations of load. In accordance with this feature of the invention, means are provided in the piston chamber for restraining the extent of the diffusion of the fuel in the air. In one embodiment of this feature, the charges of fuel are injected at a high velocity onto a wall in the piston chamber so that the diffusion of the fuel in the surrounding air is effected in part by the impact of the fuel upon the wall, said wall being shaped so as to restrain the extent of the diffusion by impact and thus localize the diffusion of the fuel in the air. To make the diffusion by impact uniform and reliable, the charges of fuel should be injected in compact jets and the wall onto which the jets are directed should be swept by the incoming air charges to prevent the accumulation of any fuel deposit. In accordance with the preferred construction, moreover, the wall onto which the fuel is injected forms a part of a recess adapted to inclose a small portion of the compressed charge so that the diffusion of the smaller charges of fuel may be limited substanially to the air in the said recess or in its immediate vicinity at or near the ends of the compression periods. Preferably, also, said recess is arranged to be swept by the incoming air charges so that the accumulation of fuel therein will be prevented and so that by suitably advancing the injecting periods with relation to the piston as the fuel charges increase, any part of the fuel charges in excess of that required to form an ignitable mixture with the air in the recess and its immediate vicinity at or near the ends of the compression periods, will be displaced by the incoming air charges, thus insuring not only that the smallest charges of fuel will be localized and rendered ignitible at the times when ignition is desired but also that a part of the larger fuel charges will be similarly localized and rendered ignitible, the localization in both cases being at the same place in the piston chamber. By locating the active parts of the igniting means at the same place and properly timing their operation, uniform ignition of the fuel charges, irrespective of their sizes, is insured.

Preferably the inlet and exhaust ports for the air and waste gases, respectively, are arranged to be opened and closed by the piston when near the ends of its working strokes, and the recess is formed at one side of the working face of the piston so as to be swept by the incoming air and to direct the same away from the exhaust port, the localized charges or portions of charges being partly confined by said recess in conjunction with the adjacent wall of the piston chamber and localized at one side of the compressed charges, thereby facilitating the control of the fuel diffusion and promoting rapid and complete combustion.

Where the speed of the engine is varied, the means for injecting the fuel charges should be constructed to vary the velocity of the fuel jets in relation to the speed of the engine, said relation being such that the degree of the diffusion of the fuel by impact will correspond approximately with the speed of the engine. In this way the variation in the time available for diffusion is more or less compensated for so that, irrespective of the speed variations, the desired portions of the air charges will be effectively carbureted at or near the ends of the compression periods.

While the best efficiency will be realized by admitting full charges of air to the combustion chamber for all loads, thereby securing the maximum compression, the flexibility or practical working range may be increased in some cases, as in engines having a suction stroke, by admitting smaller air charges to the piston chamber thereby reducing the compression and permitting the practical use of smaller fuel charges. If desired, moreover, the power of the engine may be varied by varying the time of ignition or by intermittently cutting off the supply of fuel or the supplies of both fuel and air.

Any fuel, the diffusion of which can be properly controlled, may be employed. While a highly volatile fuel such as gasolene or alcohol will be diffused to a certain extent by evaporation, it has been found that a sufficient degree of diffusion of a less volatile fuel such as kerosene may be secured by the impact of the fuel when injected under high velocity.

My invention consists in the novel devices, combinations and improvements in the art herein illustrated and described.

In order that my invention may be more fully understood I have illustrated in the accompanying drawings which are referred to herein and form a part hereof an embodiment of the invention, which, together with the description herein, serves to explain the principles of the invention and one way of carrying the same into effect.

Referring in detail to the drawings, the particular embodiment of the invention therein illustrated comprises a cylinder 1, a piston 2, a crank shaft 3, having a crank pin 4, a connection rod 5 by which the piston is connected with the crank, the whole being mounted on a base 6. While the cylinder 1 is shown as being provided with a water cooling chamber 7, air cooling means may be employed if desired.

Any suitable means may be employed for supplying the charges of air to the piston chamber formed by the cylinder 1. As shown the crank 4 is inclosed by a case 8 so as to form a compressing chamber for the air charges, to which chamber air is admitted by a suitable automatic inlet valve 9. The piston chamber is provided with inlet and exhaust ports for the admission of air and discharge of waste gases, said ports being numbered 10 and 11 respectively. The inlet port 10 communicates with the crank case 8 by a passage 12. The ports 10 and 11 are arranged to be opened by the piston near the ends of its working strokes, the exhaust port 11 being arranged slightly above the inlet port 10 so as to permit the pressure of the waste gases to fall before the air inlet port is opened. In order that the incoming air may be directed away from the exhaust port and in such manner as to displace the waste gases, the piston 2 is provided at one side of its working face with a recess 13 having an upwardly curved wall adapted to direct the incoming air toward the top of the piston chamber. A charge of air is thus supplied to the piston chamber and compressed therein by the upward movement of the piston during each revolution of the engine. Since the charges of air are, during the compression period, confined in the piston chamber, which in the present embodiment constitutes the combustion chamber, they are compressed without excessive commotion of the air, the diffusion of the fuel in portions only of the air charges being thereby facilitated.

Figure 4:
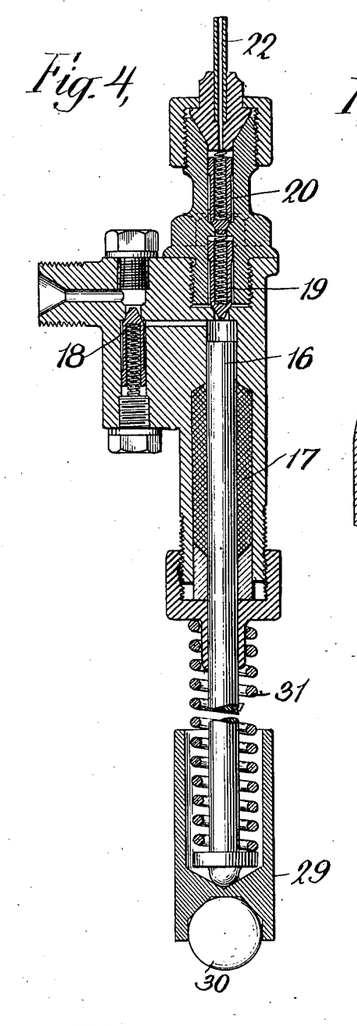
Fig. 4 is a vertical central section of the same on an enlarged scale.
Figure 5:
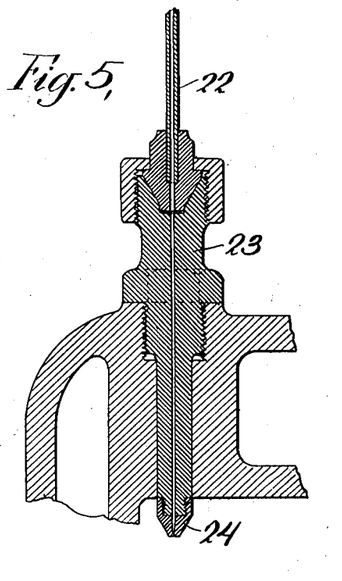
Fig. 5 is a sectional view of another detail.
Figures 9, 12:
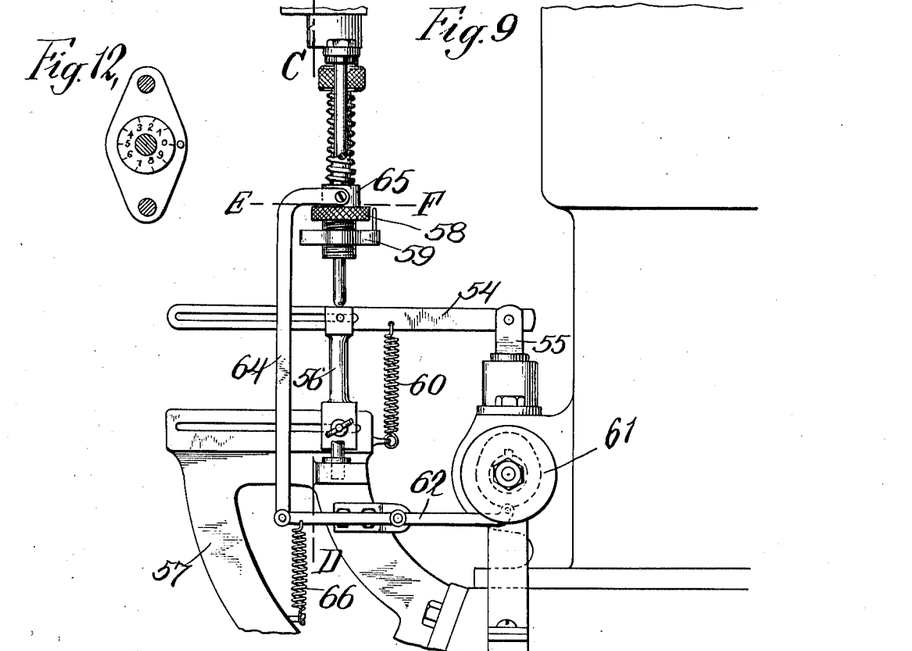
Fig. 9 is a side elevation of a device for producing a cam templet.
Fig. 12 is a transverse section of a detail of the same, the section being taken on the line E—F of Fig. 9.
Figure 10:
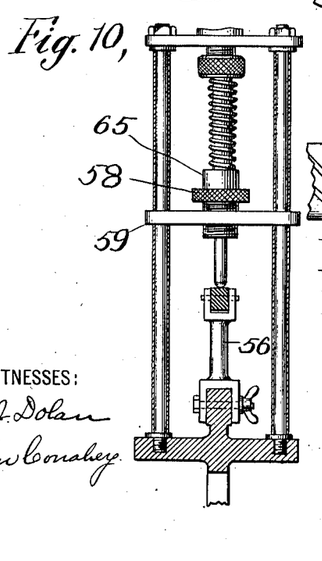
Fig. 10 is a vertical central section of the same taken substantially on the line C—D of Fig. 9.
Figure 11:
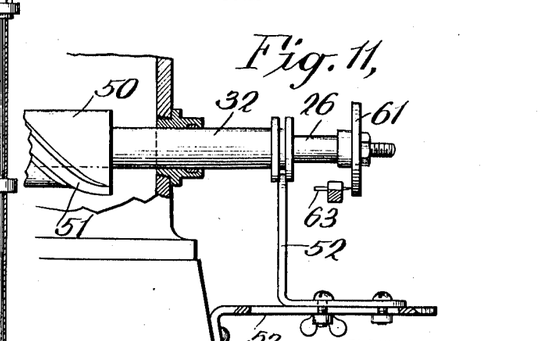
Fig. 11 is a side elevation partly in section of a detail of the same.

Any suitable means may be employed for supplying the fuel charges to the piston chamber and for controlling the diffusion of the fuel in the air so that variable portions of the air charges will be effectively carbureted at or near the ends of the compression periods. In accordance with the construction shown the fuel is supplied to the piston chamber by means of a pump. As shown this pump comprises a suitable case 14 mounted by means of rods 15 on the engine frame at one side of the cylinder 1. The details of the pump are illustrated in Fig. 4. As there shown the pump comprises a plunger 16 having a suitable packing 17. The upper end of the chamber in which the plunger reciprocates communicates by suitable passages with an inlet valve 18 and a delivery valve 19. These valves are preferably held to their seats by weak springs and a second delivery valve 20 is preferably provided to insure an accurate and reliable operation of the pump. A second inlet valve may also be provided if desired. The liquid fuel is supplied to the pump from any suitable source through a pipe 21. (See Fig. 1.) The fuel is conveyed from the pump to the piston chamber by a pipe 22 and a fitting 23 secured in the wall of the cylinder and provided at its inner end with a nozzle 24 (see Figs. 1 and 5). In order that the fuel charges may be accurately timed and determined as to their quantity, the capacity of the passages through the pump and between the pump and the delivery nozzle in the cylinder should be as small as possible without unduly increasing the pressure required to force the liquid through said passages. These passages, also, should be so shaped as to prevent the formation or retention therein of any gas or vapor which by its compression would prevent accurate operation of the pump. The nozzle 24 is, in accordance with one feature of the invention, of such size and so formed that the fuel charges will be delivered into the piston chamber in compact jets having high velocity so that the fuel may be atomized and thus effectively diffused in the air by the impact of the jets with a suitable wall in the piston chamber. Preferably the delivery orifice of the nozzle is made in the form of a plain cylinder and is made as small as possible without involving undue strain on the parts when the engine is running at maximum speed and load. A nozzle having a delivery orifice about 1/100 of an inch in diameter has been found suitable for an engine developing about 15 horse-power at about 900 revolutions a minute.

Any suitable means may be provided in the piston chamber to control the diffusion of the fuel therein so that portions only of the air charges may be effectively carbureted at or near the ends of the compression periods. In accordance with one embodiment of the invention the diffusion of the fuel is controlled by shaping the wall on which the fuel jets impinge so as to restrain the extent of the diffusion by impact of the fuel in the air. In the construction shown, the wall forming the air deflecting recess 13 in the working face of the piston is utilized for this purpose, the nozzle 24 being arranged to direct the fuel jets onto said wall. By reason of this construction diffusion of the smaller and portions of the larger fuel charges may be confined to the air in the recess formed by said wall in conjunction with the adjacent wall of the piston chamber, or to the air in the immediate vicinity of said recess, and the accumulation of any fuel deposit on the wall which received the fuel impacts is prevented by the incoming air charges which also serve to assist in the diffusion of the larger fuel charges. In order that the diffusion by impact of the smaller fuel charges may be suitably restrained to enable the engine to run uniformly and reliably under light loads, the recess 13 may be divided as by ribs or partitions 13$^a$ shown in Fig. 2, so as to provide a plurality of compartments one of which receives the fuel and is adapted to restrain the fuel diffusion as required.

The pump plunger may be driven by any suitable means adapted to properly time the fuel charges, vary their quantities, and deliver them at the required velocities into the piston chamber. In the construction shown the pump plunger is driven by a cam 25 which is mounted on a shaft 26 driven at the same speed of the engine shaft by the gears 27, 28. As shown, see Fig. 4, the cam is connected with the plunger by a reciprocating sleeve 29, having a ball 30 loosely fitted in its lower end, said sleeve being adapted to receive the lower end of the plunger 16. A spring 31 is provided to retract the plunger and keep the ball 30 in contact with the cam 25.

Any suitable means may be provided for varying the quantity of the fuel charges. Preferably, this is accomplished by varying the stroke of the plunger 16. The stroke of the plunger may be varied in numerous ways. Preferably, and as shown, however, the stroke of the plunger is varied by providing the cam 25 with a tapered conical body, having a cam projection 25$^a$ formed thereon, said projection varying in elevation above said body from a minimum at or near one end of the body to a maximum at or near the other end of the body, so that by shifting the cam longitudinally with relation to the ball 30 the latter together with the plunger 16 will be lifted more or less, depending upon the position of the cam. Any suitable means may be provided for shifting the cam with relation to the ball. As shown, see Fig. 2, the cam is mounted on a sleeve 32 adapted to slide on the shaft 26 and confined to rotate therewith by a spline 33. The sleeve 32 is extended to a point outside of the engine case and is connected by means of a grooved collar 34 and yoke 35 to a hand lever 36 the position of which may be fixed by a notched sector 37.

Any suitable means may be provided for varying the time of the fuel injecting periods with relation to the piston in accordance with the variations in the quantity of the fuel charges. Preferably and as shown, this is accomplished by making the cam projection 25ª in the form of a spiral on the conical body of the cam, the spiral being so determined as to bring about the desired relation between the size of the fuel charges and the time of their injection with relation to the movements of the piston. I have found that the shape of the cam should be such that the time or period of the injection of the smallest charges should occur during the compression period, and that as the charges increase, the periods of injection should be advanced with relation to the piston so that any part of each charge in excess of that required to effectively carburet the air in or near the recess formed by the wall in the cylinder, into which recess the fuel is delivered, will be displaced by the incoming air charge.

Figures 2, 6, 7, 8:
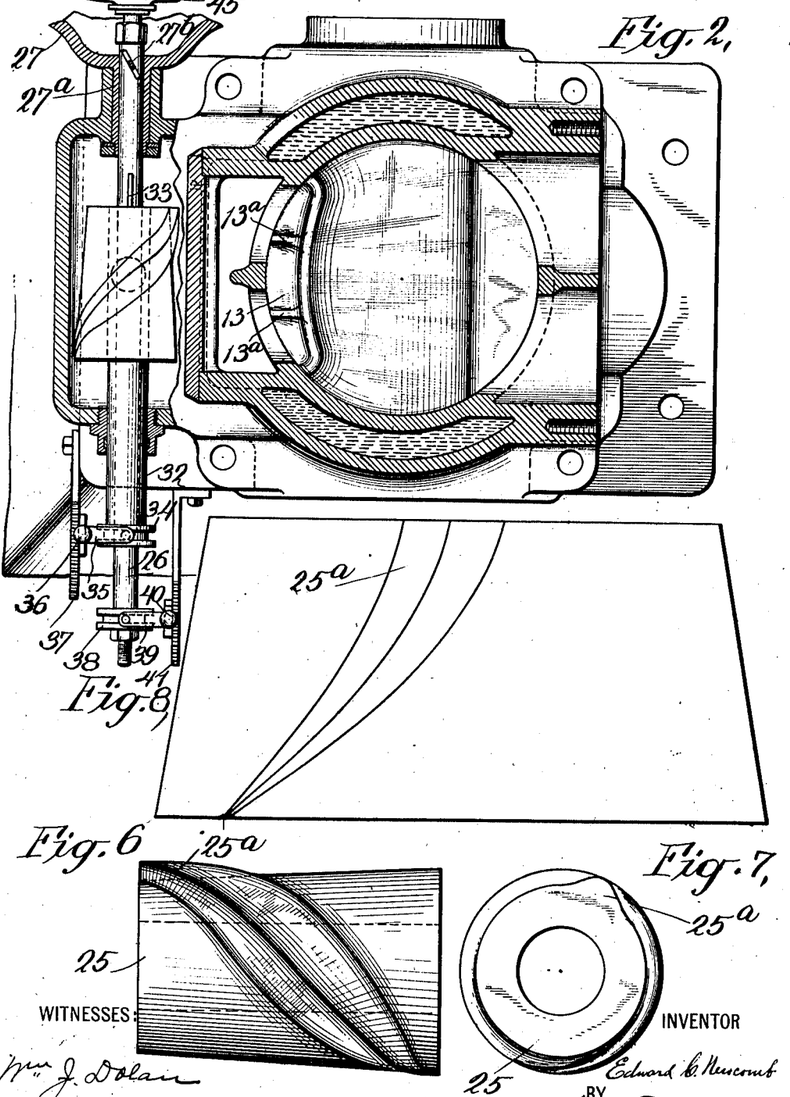
Fig. 2 is a transverse section on a larger scale taken substantially on the line A—B of Fig. 1.
Figs. 6 and 7 respectively are a side and end elevation of a cam forming a part of the fuel injecting means.
Fig. 8 is a diagrammatic view illustrating the cam developed into a plane surface.
Figure 3:
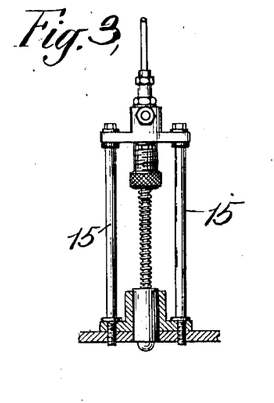
Fig. 3 is a side elevation partly in section of a detail.

The fuel injecting periods may be varied with relation to the movements of the piston to correspond with variations of speed by any suitable means. As shown, the injection periods of the fuel are varied with relation to the piston to correspond with variations of speed by means independent of the means by which the said periods are varied to correspond with variations in load. As shown in Fig. 2, the shaft 26 is loosely fitted in a sleeved hub 27ª of the gear 27 and is connected with said hub by means of a spline 27ᵇ which engages a spiral groove in the shaft. By reason of this construction the angular relation between the cam and the main shaft of the engine can be varied by shifting the shaft 26 longitudinally with relation to the gear 27. This may be accomplished in any suitable way, as by providing the shaft with a grooved collar 38, connected by yoke 39 with a hand lever 40, the position of which may be fixed by means of a notched sector 41.

Figure 1:
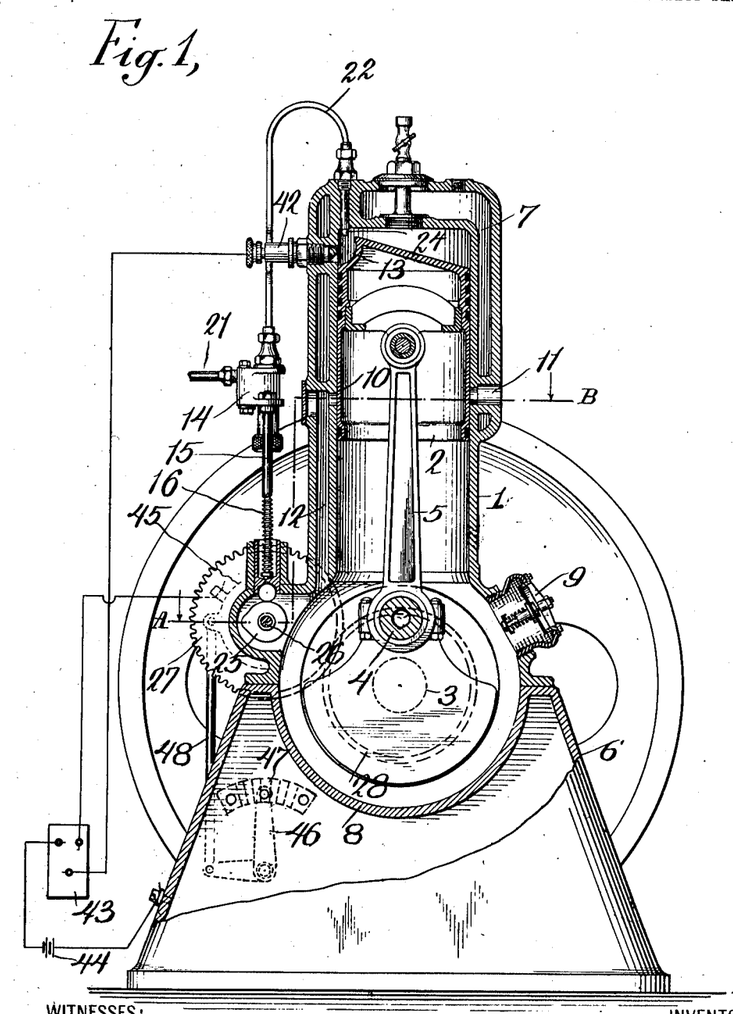
Figure 1 is a vertical central section of a two-cycle engine constructed in accordance with my invention.

Any suitable means may be employed for igniting the fuel charges. Preferably and as shown, electrical means are employed for this purpose, the same being located so that the active parts thereof are in or near the place in the piston chamber at which the effectively carbureted portions of the air charges are localized at the ends of the compression periods. As shown in Fig. 1, an ordinary form of spark plug 42 is tapped into the cylinder at a point opposite the recess 13 when the piston is at the upper limit of its stroke. This plug is connected as usual to a spark coil 43, the primary circuit of which is connected with any suitable source of electric current, as a battery 44, and with a circuit breaker or commutator indicated at 45 in Figs. 1 and 2, the rotative member of said commutator preferably being fixed on the shaft 26 so that as said shaft is shifted to vary the fuel injecting periods for variations of speed, the igniting periods will be correspondingly varied. The time of ignition may be varied independently of the fuel injecting periods by any suitable means, as by a lever 46 the position of which is controlled by a notched sector 47, said lever being connected with the non-rotating member of the commutator by a link 48.

To secure the best results, the shape of the pump operating cam 25 will vary in different engines. The shape of the cam may vary, for instance, with the degree of compression, the size of the fuel injecting nozzle, the maximum speed at which the engine is to be run, etc. In order that the best shape of cam for any particular engine or set of conditions may be determined, I have devised the apparatus illustrated in Figs. 9 to 12. In accordance with this construction, a cam having a cylindrical body 50 and a plain spiral cam projection 51 of uniform lift is mounted on the sleeve 32, the position of which sleeve may be shifted and held in any desired position by means of an arm 52 adjustably mounted upon a bracket 53 secured to the engine base 6. Instead of operating the pump plunger directly from this cam, a lever 54 is interposed. This lever is connected at one end to a slide 55 adapted to rest upon the cam and is provided with a movable fulcrum 56 which is adjustably secured on a bracket 57 secured to the engine base. The stroke of the pump is controlled by an adjustable nut 58 threaded in a fixed crosshead 59. The slide 55 is firmly held in contact with the cam by a spring 60. By varying the positions of the fulcrum 56 and the nut 58 the length of the fuel injecting strokes and the duration of said strokes with relation to the movements of the piston can be varied as much as desired within practical limits. In other words, the entire operative face of the cam considered in the circumferential direction can be utilized to give the pump any desired length of stroke from the minimum to the maximum or variable portions of the operative face of the cam can be so utilized. By shifting the cam 50 along the shaft, the time of the fuel strokes can be varied with relation to the movements of the piston, as desired. In this way the duration and the time of the injecting periods for any given load or length of stroke of the pump can be varied so as to get the best results. When the most effective period and phase of the pump have thus been determined the pump may be caused to lay out its own cam as follows: A templet disk 61 is fixed on the shaft 26. A lever 62 is fulcrumed at an intermediate point on the bracket 57 and is provided at one end with a scriber 63 adapted to bear against the face of the disk 61. The other end of the lever 62 is connected by a link 64 with a head 65 fixed on the pump plunger. A spring 66 serves to take up lost motion. When the proper stroke of the pump has been determined, the scriber 63 is pressed against the disk 61 so as to mark thereon a line which corresponds to the movement of the pump. This templet may then be used to form a cam which, if mounted on the shaft 26 at an angle of 180 degrees from that occupied by the disk, would produce the same movements of the pump plunger by which the templet was produced. A templet 61 may be provided in this way for each of a sufficient number of different loads or lengths of pump stroke to enable a complete cam, such as the cam 25, to be produced. The shaft 26 is fixed with relation to its driving gear while these templets are being made and as each templet has its angular position with relation to the shaft fixed by a suitable pin or key, each templet will represent not only the proper shape of the cam for a certain load or length of pump stroke but it will also represent the proper angular position of that portion of the cam.

It will be seen that the embodiment of my invention herein specifically disclosed by way of example is simple in construction and easy to adjust and control and that the parts are positive in action there being no delicate adjustments to maintain such as are inherent, for example, in the ordinary carbureter.

Among other advantages of this engine are the following: Although of the two cycle type, it will operate uniformly and reliably through wide ranges of load and speed; it is highly efficient thermally and mechanically when operating at low loads and speeds as well as when operating at high loads and speeds; and it will develop its maximum torque at a relatively low speed being thereby adapted for use in automobiles and for the propulsion of vehicles in general, without the use of complicated speed changing devices.

It is to be understood that my invention in its broader aspects is not confined to the particular construction by which it has been or may be carried into effect, as many changes may be made in the construction without departing from the main principles of the invention and without sacrificing its chief advantages.

Having thus described my invention, what I claim and wish to secure by Letters Patent is:

1. An internal combustion engine of the compression type, including means for supplying charges of air to the piston chamber, means for supplying variable charges of a liquid fuel to said chamber during periods beginning subsequently to the beginning of the air supplying periods, means in said chamber for regulating the extent of the diffusion of the fuel in the air whereby variable portions of the air charges are effectively carbureted at or near the ends of the compression periods, and means for igniting the carbureted portions of the air charges at predetermined periods, whereby substantially complete combustion of the fuel may be effected at the instants of maximum compression.

2. An internal combustion engine of the compression type, including means for supplying charges of air under pressure to the piston chamber at or near the ends of the working strokes, means for supplying variable charges of a liquid fuel to said chamber, means in said chamber for regulating the extent of the diffusion of the fuel in the air whereby variable portions of the air charges are effectively carbureted at or near the ends of the compression periods, and means for igniting said carbureted portions of the air charges at predetermined periods, whereby substantially complete combustion of the fuel may be effected at the instants of maximum compression.

3. An internal combustion engine of the compression type, including means for supplying charges of air to the piston chamber, means for supplying charges of a liquid fuel to said chamber, means for varying the quantity of the fuel charges, and means for advancing the fuel supplying periods each as a whole with relation to the piston as the fuel charges increase.

4. An internal combustion engine of the compression type, including means for supplying charges of air to the piston chamber, means for supplying charges of a liquid fuel to said chamber, means for varying the quantity of the fuel charges, means for advancing the fuel supplying periods each as a whole with relation to the piston as the fuel charges increase, and means for independently advancing the fuel supplying periods in accordance with the increase in the speed of the engine.

5. An internal combustion engine of the compression type, including means for supplying charges of air to the piston chamber, means for supplying charges of a liquid fuel to said chamber, means for regulating the extent of the diffusion of the fuel in said chamber, and means for simultaneously increasing the quantity of the fuel charges and advancing the fuel supplying periods with relation to the piston.

6. An internal combustion engine of the compression type, including means for supplying charges of air to the piston chamber, means for supplying charges of a liquid fuel to said chamber, means for simultaneously increasing the quantity of the fuel charges and advancing the fuel supplying periods with relation to the piston and means for independently advancing the fuel supplying periods in accordance with the increase in the speed of the engine.

7. An internal combustion engine of the compression type including means for supplying charges of air to the piston chamber, means for supplying to said chamber all the fuel for each of said air charges, and means for advancing the fuel supplying periods with relation to the piston in accordance with the increase in the speed of the engine.

8. An internal combustion engine of the compression type, including means for supplying charges of air to the piston chamber, means for supplying charges of a liquid fuel to said chamber, means for varying the quantity of the fuel charges and means for advancing the fuel supplying periods with relation to the piston in accordance with the increase in the speed of the engine.

9. An internal combustion engine of the compression type, including means for supplying charges of air to the piston chamber, means for supplying charges of a liquid fuel to said chamber, means for simultaneously increasing the quantity of the fuel charges and advancing the fuel supplying periods with relation to the piston, means for independently advancing the fuel supplying periods in accordance with the increase in the speed of the engine, means for igniting the fuel charges, and means for varying the igniting periods.

10. An internal combustion engine of the compression type, including means for supplying charges of air to the piston chamber, means for supplying charges of a liquid fuel to said chamber, means for simultaneously increasing the quantity of the fuel charges and advancing the fuel supplying periods with relation to the piston, means for igniting the fuel charges, and means for simultaneously advancing the fuel supplying and igniting periods in accordance with the increase in the speed of the engine.

11. An internal combustion engine of the compression type, including means for supplying charges of air to the piston chamber, means for supplying variable charges of a liquid fuel to said chamber, means for advancing the fuel supplying periods each as a whole with relation to the piston as the quantity of the fuel charges increases, means in said chamber for restraining the extent of the diffusion of the fuel in the air whereby variable portions of the air charges are effectively carbureted at or near the ends of the compression periods, and means for igniting the carbureted portions of the air charges at predetermined periods, whereby substantially complete combustion of the fuel may be effected at the instants of maximum compression.

12. An internal combustion engine of the compression type, including means for supplying charges of air under pressure to the piston chamber at or near the ends of the working strokes, means for supplying variable charges of a liquid fuel to said chamber, means for advancing the fuel supplying periods with relation to the piston as the quantity of the fuel charges increases, means for independently advancing the fuel supplying periods in accordance with the increase in the speed of the engine, means in said chamber for restraining the extent of the diffusion of the fuel in the air whereby variable portions of the air charges are effectively carbureted at or near the ends of the compression strokes, and means for igniting the carbureted portions of the air charges at predetermined periods, whereby substantially complete combustion of the fuel may be effected at the instants of maximum compression.

13. An internal combustion engine of the compression type including means for supplying charges of air to the piston chamber, and means for injecting charges of a liquid fuel into said chamber during periods beginning subsequently to the air supplying periods, said fuel charges being directed onto a wall in said chamber which is swept by the incoming air charges and said wall being shaped to restrain the extent of the diffusion of the fuel by impact therewith.

14. An internal combustion engine of the compression type including means for supplying charges of air to the piston chamber, said means being constructed to admit the air under pressure to said chamber near the ends of the working strokes of the piston, and means for injecting charges of a liquid fuel into said chamber during periods beginning subsequently to the beginning of the air supplying periods, said fuel charges being directed onto a wall in said chamber which is swept by the incoming air charges and said wall being shaped to restrain the extent of the diffusion of the fuel by impact therewith.

15. An internal combustion engine of the compression type, including means for supplying charges of air to the piston chamber, and means for injecting charges of a liquid fuel in compact jets onto a wall in said chamber which is swept by the incoming air charges, said injecting means being constructed to vary the velocity of the fuel jets in a predetermined relation to the speed of the engine and said wall being shaped to restrain the extent of the diffusion of the fuel by impact therewith.

16. An internal combustion engine of the compression type, including means for supplying charges of air to the piston chamber, means for injecting charges of a liquid fuel in compact jets onto a wall in said chamber which is swept by the incoming air charges, said injecting means being constructed to vary the velocity of the fuel jets in a predetermined relation to the speed of the engine and said wall being shaped to restrain the extent of the diffusion of the fuel by impact therewith, and means for advancing the fuel injecting periods with relation to the piston as the speed of the engine increases.

17. An internal combustion engine of the compression type, including means for supplying charges of air to the piston chamber, means for injecting charges of a liquid fuel onto a wall in said chamber which is swept by the incoming air charges, said wall being shaped to restrain the extent of the diffusion of the fuel by impact therewith, means for varying the quantity of the fuel charges, and means for advancing the fuel injecting periods with relation to the piston as the fuel charges increase, whereby any part of the respective fuel charges in excess of that required to form an ignitible mixture with the compressed air in the vicinity of the said wall at or near the end of the compression period will be displaced by the incoming air.

18. An internal combustion engine of the compression type, including means for supplying charges of air to the piston chamber, said means being constructed to admit the air under pressure to said chamber near the ends of the working strokes, means for injecting charges of a liquid fuel in compact jets onto a wall in said chamber which is swept by the incoming air charges, said injecting means being constructed to vary the velocity of the fuel jets in a predetermined relation to the speed of the engine and said wall being shaped to restrain the extent of the diffusion of the fuel by impact therewith, means for varying the quantity of the fuel charges, means for advancing the fuel injecting periods with relation to the piston as the fuel charges increase, means for independently advancing the fuel injecting periods as the speed of the engine increases, whereby, irrespective of the speed of the engine, any part of the respective fuel charges in excess of that required to form an ignitible mixture with the air in the vicinity of the said wall at or near the end of the compression period will be displaced by the incoming air charges.

19. An internal combustion engine of the compression type, including means forming a piston chamber with inlet and exhaust ports for air and waste gases respectively, a piston, one of said parts having a recess arranged to be swept by the incoming air and to partly inclose a small portion of the compressed charge, means for injecting charges of a liquid fuel into said recess, and means for retarding the fuel injecting period with relation to the air inlet period.

20. An internal combustion engine of the compression type, including means forming a piston chamber with inlet and exhaust ports for air and waste gases respectively, a piston, one of said parts having a recess arranged to be swept by the incoming air and to partly inclose a small portion of the compressed charge, and means for injecting charges of a liquid fuel in compact jets into said recess, said injecting means being constructed to vary the velocity of the fuel jets directly with relation to the speed of the engine.

21. An internal combustion engine of the compression type, including means forming a piston chamber with inlet and exhaust ports for air and waste gases respectively, a piston, one of said parts having a recess arranged to be swept by the incoming air and to partly inclose a small portion of the compressed charge, means for injecting charges of a liquid fuel in compact jets into said recess, said injecting means being constructed to vary the velocity of the fuel jets in a predetermined relation to the speed of the engine, and means for advancing the fuel injecting periods with relation to the piston as the speed of the engine increases.

22. An internal combustion engine of the compression type, including means forming a piston chamber with inlet and exhaust ports for air and waste gases respectively, a piston, one of said parts having a recess arranged to be swept by the incoming air and to partly inclose a small portion of the compressed charge, means for injecting charges of a liquid fuel into said recess, means for varying the quantity of the fuel charges, means for advancing the fuel injecting periods with relation to the piston as the fuel charges increase, and means for igniting the fuel in or near said recess at or near the ends of the compression periods.

23. An internal combustion engine of the compression type, including means forming a piston chamber with inlet and exhaust ports for air and waste gases respectively, a piston, one of said parts having a recess arranged to be swept by the incoming air and to partly inclose a small portion of the compressed charge, and means for injecting charges of a liquid fuel in compact jets into said recess, said injecting means being constructed to vary the velocity of the fuel jets in a predetermined relation to the speed of the engine, means for varying the quantity of the fuel charges, means for advancing the fuel injecting periods with relation to the piston as the fuel charges increase, means for independently advancing the fuel injecting periods as the speed of the engine increases, and means for igniting the fuel in or near the said recess at or near the ends of the compression periods.

24. An internal combustion engine of the compression type, including a piston, means forming a piston chamber with inlet and exhaust ports for air and waste gases respectively, said ports being arranged to be opened and closed by the piston when near the ends of its working strokes, and said piston having at one side of its working face a recess arranged to be swept by the incoming air and to direct the same away from the exhaust port, said recess in conjunction with the adjacent wall of the piston chamber serving to partly inclose a small portion of the compressed charge, and means for injecting charges of a liquid fuel into said recess at or near the ends of the compression periods.

25. An internal combustion engine of the compression type, including a piston, means forming a piston chamber with inlet and exhaust ports for air and waste gases respectively, said ports being arranged to be opened and closed by the piston when near the ends of its working strokes and said piston having at one side of its working face a recess arranged to be swept by the incoming air and to direct the same away from the exhaust port, said recess in conjunction with the adjacent wall of the piston chamber serving to partly inclose a small portion of the compressed charge, means for injecting charges of a liquid fuel in compact jets into said recess, said injecting means being constructed to vary the velocity of the fuel jets in a predetermined relation to the speed of the engine, and means for igniting the fuel in or near said recess at or near the ends of the compression periods.

26. An internal combustion engine of the compression type, including a piston, means forming a piston chamber with inlet and exhaust ports for air and waste gases respectively, said ports being arranged to be opened and closed by the piston when near the ends of its working strokes, and said piston having on one side of its working face a recess arranged to be swept by the incoming air and to direct the same away from the exhaust port, said recess in conjunction with the adjacent wall of the piston chamber serving to partly inclose a small portion of the compressed charge, means for injecting charges of a liquid fuel in compact jets into said recess, means for advancing the fuel injecting periods with relation to the piston as the speed of the engine increases, and means for igniting the fuel in or near said recess at or near the ends of the compression periods.

27. An internal combustion engine of the compression type, including a piston, means forming a piston chamber with inlet and exhaust ports for air and waste gases respectively, said ports being arranged to be opened and closed by the piston when near the ends of its working strokes, said piston having at one side of its working face a recess arranged to be swept by the incoming air and to direct the same away from the exhaust port, said recess in conjunction with the adjacent wall of the piston chamber serving to partly inclose a small portion of the compressed charge, means for injecting charges of a liquid fuel into said recess, means for varying the quantity of the fuel charges, means for advancing the fuel injecting periods with relation to the piston as the fuel charges increase, whereby any part of the respective fuel charges in excess of that required to form an ignitible mixture with the compressed air in the vicinity of the said recess at or near the end of the compression period will be displaced by the incoming air, and means for igniting the fuel in or near said recess at or near the ends of the compression periods.

28. An internal combustion engine of the compression type, including a piston, means forming a piston chamber with inlet and exhaust ports for air and waste gases respectively, said ports being arranged to be opened and closed by the piston when near the ends of its working strokes, and said piston having on one side of its working face a recess arranged to be swept by the incoming air and to direct the same away from the exhaust port, said recess in conjunction with the adjacent wall of the piston chamber serving to partly inclose a small portion of the compressed charge, means for injecting charges of liquid fuel in compact jets into said recess, said injecting means being constructed to vary the velocity of the fuel jets in a predetermined relation to the speed of the engine, means for varying the quantity of the fuel charges, means for advancing the fuel injecting periods with relation to the piston as the fuel charges increase, means for independently advancing the fuel injecting periods as the speed of the engine increases, whereby, irrespective of the speed of the engine, any part of the respective fuel charges in excess of that required to form an ignitible mixture with the air in the vicinity of the said recess at or near the ends of the compression periods will be displaced by the incoming air charges, and means for igniting the fuel in or near said recess at or near the ends of the compression periods.

29. An internal combustion engine including in combination, means for admitting charges of air to the combustion chamber, means for compressing the air charges without excessive commotion thereof, means for admitting variable charges of a liquid fuel to the combustion chamber during periods beginning subsequently to the beginning of the air-supplying periods and prior to the time of ignition, means for diffusing the variable fuel charges in variable portions of the compressed air charges, and means for igniting the diffused fuel.

30. An internal combustion engine including in combination, means for injecting charges of air into the combustion chamber at the ends of the expansion strokes of the piston to scavenge the combustion chamber, means for compressing the air charges, means for injecting charges of a liquid fuel into the combustion chamber during periods beginning subsequently to the beginning of the air-injecting periods and prior to the time of ignition, means for controlling the extent of the diffusion of the fuel in the air whereby an ignitible mixture is formed with portions only of the air charges at the ends of the compression periods, and means for igniting said mixtures.

31. An internal combustion engine including in combination, means for injecting charges of air into the combustion chamber at the ends of the expansion strokes of the piston to scavenge the combustion chamber, means for compressing the air charges, means for injecting variable charges of a liquid fuel into the combustion chamber during periods beginning subsequently to the beginning of the air-injecting periods and prior to the time of ignition, means for controlling the extent of diffusion of the fuel in the air whereby ignitible mixtures are formed with variable portions of the air charges at the ends of the compression periods, and means for igniting said mixtures.

32. An internal combustion engine of the two-cycle type including in combination, a compressed air inlet port, a piston having an air-deflecting recess, means for injecting fuel into said recess, and means for varying the fuel injecting period with relation to the air inlet period.

33. An internal combustion engine of the two-cycle type including in combination, a compressed air inlet port, a piston having an air-deflecting recess divided into a plurality of compartments, and means for injecting a liquid fuel into one of said compartments.

34. An internal combustion engine of the two-cycle type including in combination, a compressed air inlet port, a piston having an air-deflecting recess divided into a plurality of compartments, means for injecting a liquid fuel into one of said compartments, and means for varying the fuel injecting period with relation to the air inlet period.

35. An internal combustion engine of the compression type including in combination, means for supplying charges of air to the piston chamber, means for compressing the air charges in said chamber, means for supplying variable charges of a liquid fuel to said chamber during periods ending subsequently to the air-supplying periods, means in said chamber for controlling the extent of the diffusion of the fuel in the air whereby variable portions of the air charges are effectively carbureted at or near the ends of the compression periods, and means for igniting the carbureted portions of the air charges at predetermined periods, whereby substantially complete combustion of the fuel may be effected at the instants of maximum compression.

36. An internal combustion engine of the compression type including in combination, means for supplying charges of air under pressure to the piston chamber at or near the ends of the expansion strokes, means for compressing the air charges without excessive commotion thereof, means for supplying variable charges of a liquid fuel to said chamber during periods ending subsequently to the air-supplying periods, means in said chamber for controlling the extent of the diffusion of the fuel in the air whereby variable portions of the air charges are effectively carbureted at or near the ends of the compression periods, and means for igniting said carbureted portions of the air charges at predetermined periods, whereby substantially complete combustion of the fuel may be effected at the instants of maximum compression.

37. An internal combustion engine of the compression type including means for supplying charges of air to the piston chamber, and means for injecting charges of a liquid fuel into said chamber during periods ending subsequently to the air supplying periods, said fuel charges being directed onto a wall in said chamber which is swept by the incoming air charges and said wall being shaped to restrain the extent of the diffusion of the fuel by impact therewith.

38. An internal combustion engine of the compression type including means for supplying charges of air to the piston chamber, said means being constructed to admit the air under pressure to said chamber near the ends of the working strokes of the piston, and means for injecting charges of a liquid fuel into said chamber during periods ending subsequently to the air supplying periods, said fuel charges being directed onto a wall in said chamber which is swept by the incoming air charges and said wall being shaped to restrain the extent of the diffusion of the fuel by impact therewith.

39. An internal combustion engine including in combination, means for admitting charges of air to the combustion chamber, means for compressing the charges of air without excessive commotion thereof, means for admitting variable charges of a liquid fuel to the combustion chamber during periods ending subsequently to the air admission periods and prior to the time of ignition, means for diffusing the variable fuel charges in variable portions of the compressed air charges, and means for igniting the diffused fuel.

40. An internal combustion engine including in combination, means for supplying charges of air to the combustion chamber at the ends of the expansion strokes of the piston to scavenge the combustion chamber, means for compressing the air charges, means for injecting charges of a liquid fuel into the combustion chamber during periods ending subsequently to the air-injecting periods and prior to the time of ignition means for controlling the extent of diffusion of the fuel in the air whereby an ignitible mixture is formed in portions only of the air charges at the ends of the compression periods, and means for igniting said mixtures.

41. An internal combustion engine including in combination, means for injecting charges of air into the combustion chamber at the ends of the expansion strokes of the piston to scavenge the combustion chamber, means for compressing the charges of air without excessive commotion thereof, means for injecting variable charges of a liquid fuel into the combustion chamber during periods ending subsequently to the air-injecting periods and prior to the time of ignition, means for controlling the extent of diffusion of the fuel in the air whereby ignitible mixtures are formed with variable portions of the air charges at the ends of the compression periods, and means for igniting said mixtures.

42. The method of securing substantially complete combustion in internal combustion engines substantially at the instant of maximum compression, including the following steps: admitting an air charge to the piston chamber, compressing the air charge in the piston chamber, admitting a fuel charge to the piston chamber, controlling the diffusion of the fuel therein to form an ignitible mixture in a portion only of the air charge at or near the end of the compression period, and igniting this ignitible mixture near the end of the compression period and while in free communication with the remainder of the air charge.

43. The method of varying the power of an internal combustion engine which method includes the following steps: admitting charges of air to the combustion chamber, compressing the respective air charges in the combustion chamber, admitting fuel charges of different sizes to different air charges, controlling the diffusion of the fuel in the respective air charges to form ignitible mixtures in corresponding variable portions of the air charges at or near the ends of the compression periods, and igniting said ignitible mixtures.

In testimony whereof, I have signed my name to this specification, in the presence of two subscribing witnesses.

EDWARD C. NEWCOMB.

Witnesses:
H. B. YOUNKIN,
JOHN CONAHEY.